July 29, 1952 — M. P. WINTHER ET AL — 2,604,964

MAGNETIC FLUID MIXTURE CLUTCH WITH PLOW

Filed Jan. 21, 1949 — 4 Sheets-Sheet 1

Martin P. Winther,
Ralph L. Jaeshke,
Inventors.
Haynes and Koenig
Attorneys.

July 29, 1952   M. P. WINTHER ET AL   2,604,964
MAGNETIC FLUID MIXTURE CLUTCH WITH PLOW
Filed Jan. 21, 1949   4 Sheets-Sheet 2

Martin P. Winther,
Ralph L. Jaeschke,
Inventors.
Haynes and Koenig
Attorneys.

July 29, 1952  M. P. WINTHER ET AL  2,604,964
MAGNETIC FLUID MIXTURE CLUTCH WITH PLOW
Filed Jan. 21, 1949  4 Sheets-Sheet 3

Martin P. Winther,
Ralph L. Jaeschke,
Inventors
Haynes and Koenig,
Attorneys.

July 29, 1952     M. P. WINTHER ET AL     2,604,964
MAGNETIC FLUID MIXTURE CLUTCH WITH PLOW
Filed Jan. 21, 1949     4 Sheets-Sheet 4

Martin P. Winther,
Ralph L. Jaeschke,
Inventors.
Haynes and Koenig,
Attorneys.

Patented July 29, 1952

2,604,964

UNITED STATES PATENT OFFICE 2,604,964

MAGNETIC FLUID MIXTURE CLUTCH WITH PLOW

Martin P. Winther, Gates Mills, Ohio, and Ralph L. Jaeschke, Kenosha, Wis.; said Winther assignor to Martin P. Winther, as trustee, and said Jaeschke assignor to Dynamatic Corporation, Kenosha, Wis., a corporation of Delaware Application January 21, 1949, Serial No. 71,844

21 Claims. (Cl. 192—21.5)

1

This invention relates generally to dynamo-electric machines, and with regard to certain more specific features, to electric clutches employing a granular magnetic coupling material.

Among the several objects of the invention may be noted the provision of an electric clutch having an improved granular magnetic material incorporating better qualities of distribution whereby better dynamic balance is assured under all operating conditions; the provision of a clutch of the class described incorporating means for controlling the distribution of the magnetic material to obtain optimum running and idling conditions without undesirable drag in the case of the latter; the provision of a clutch of this class in which the magnetic material may more easily be retained and in which excessive churning is avoided; and the provision of a clutch of this class in which the magnetic material is of a more permanent nature. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a fragmentary longitudinal section of a clutch embodying one form of the invention and viewed on line 1—1 of Fig. 2;

Figure 1:
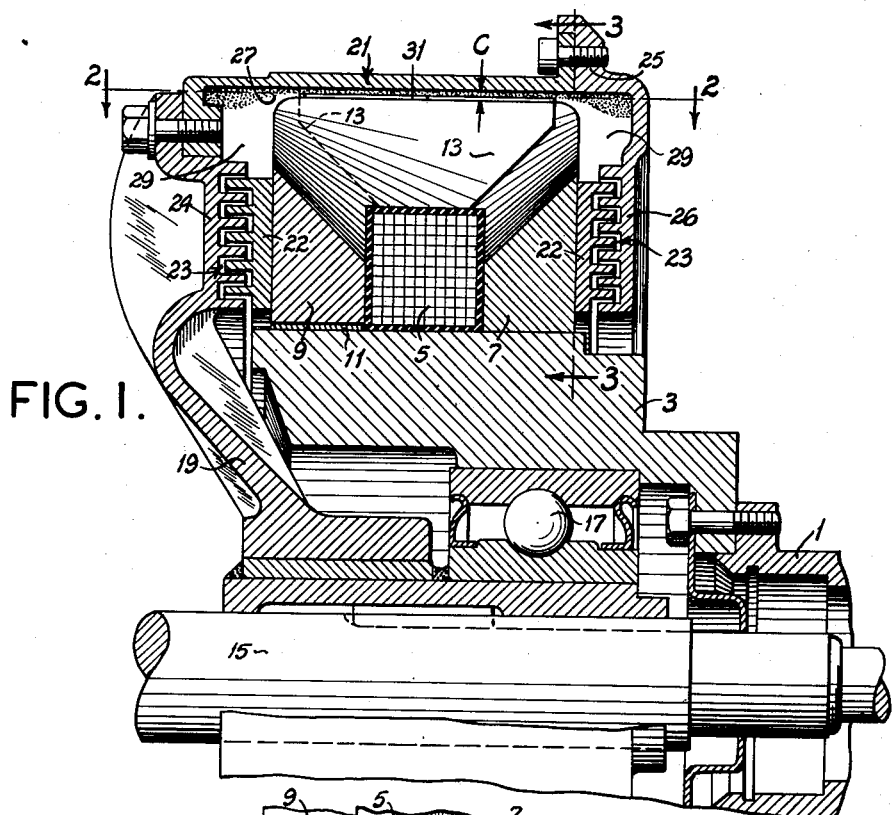
Figure 2:
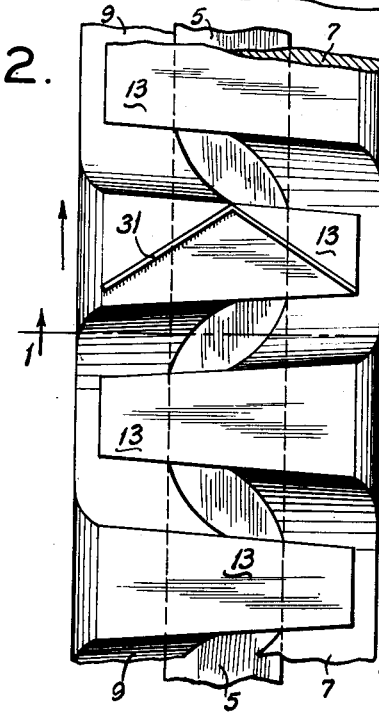
Fig. 2 is a developed plan view of several poles as viewed from the section line 2—2 in Fig. 1.
Figure 3:
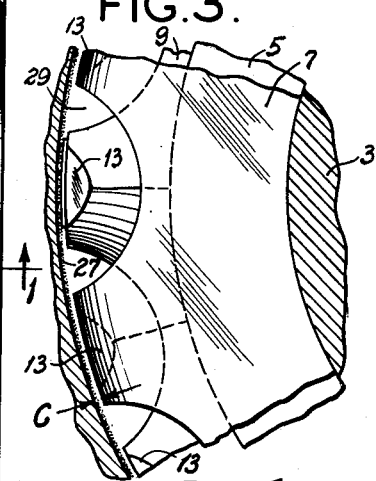
Fig. 3 is a fragmentary detail section taken on line 3—3 of Fig. 1.
Figure 4:
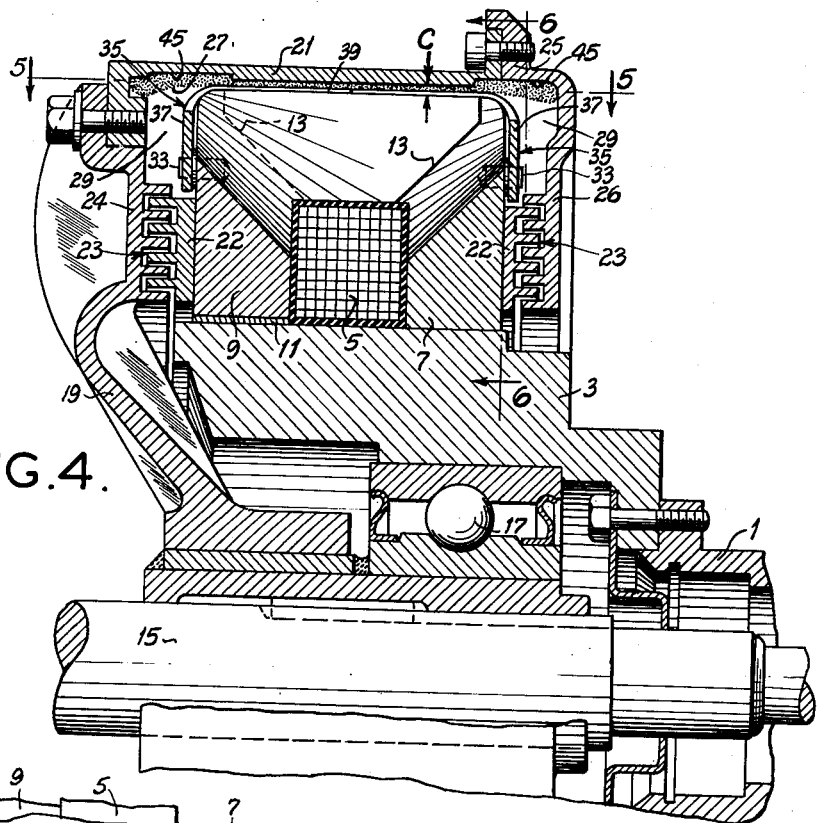
Figure 5:
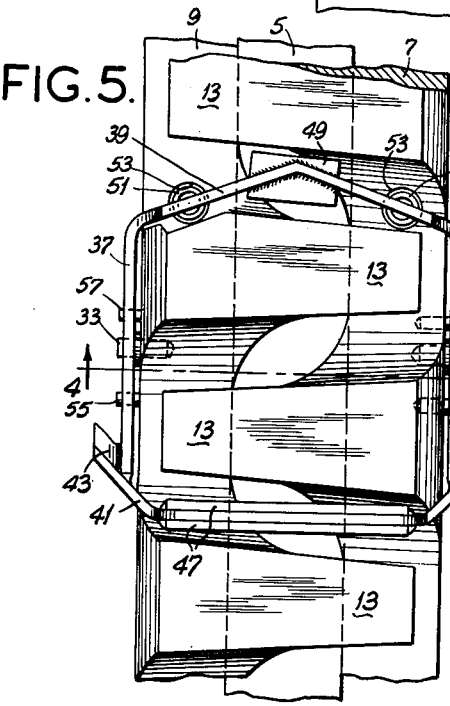
Figure 6:
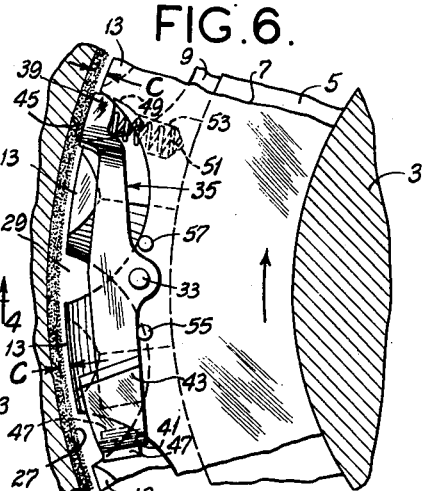
Figure 7:
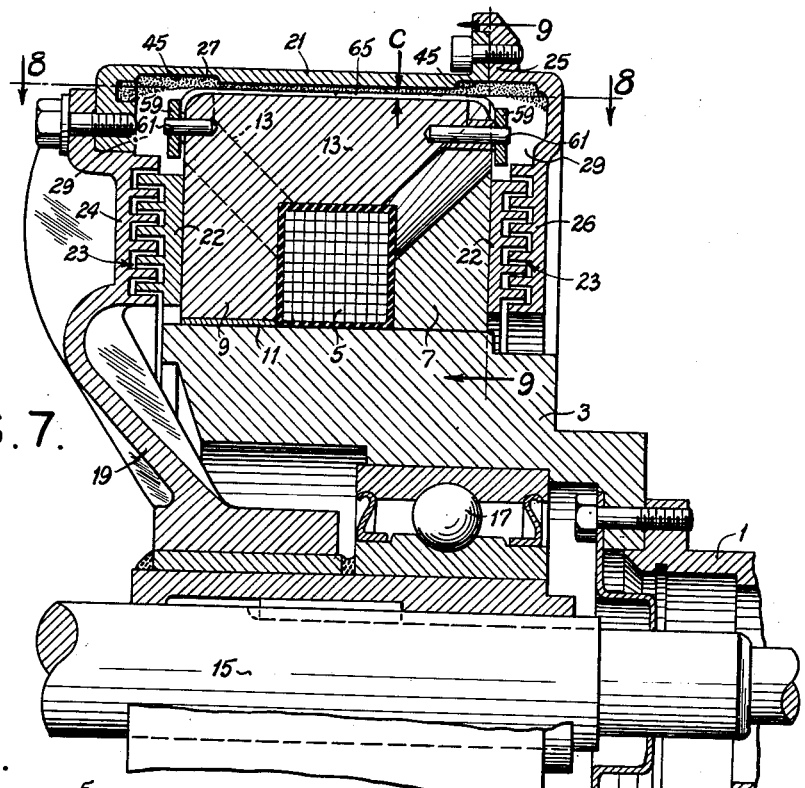
Figure 8:
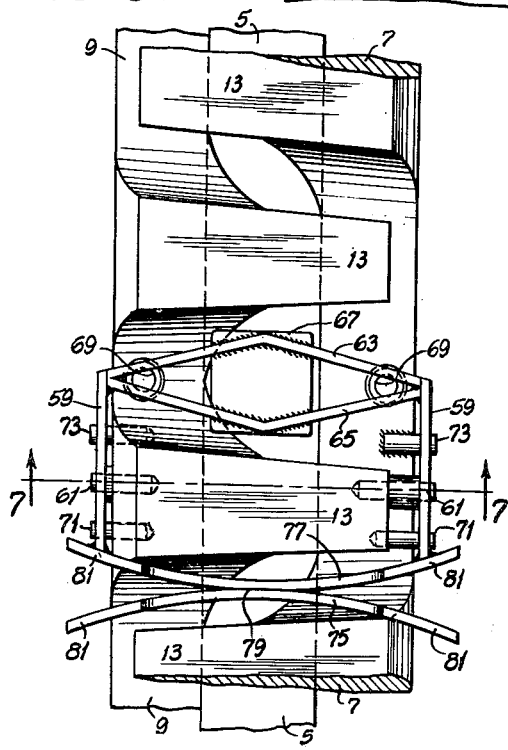
Figure 9:
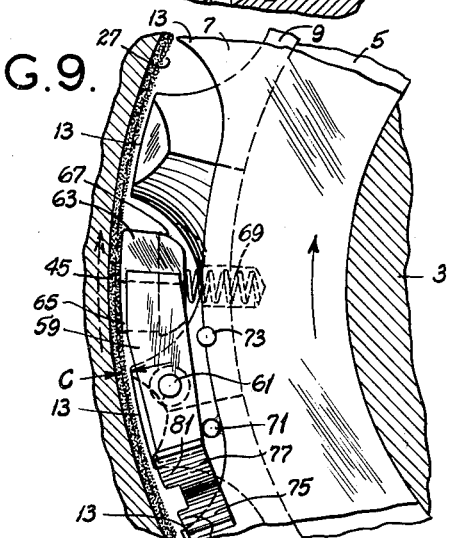
Figure 10:
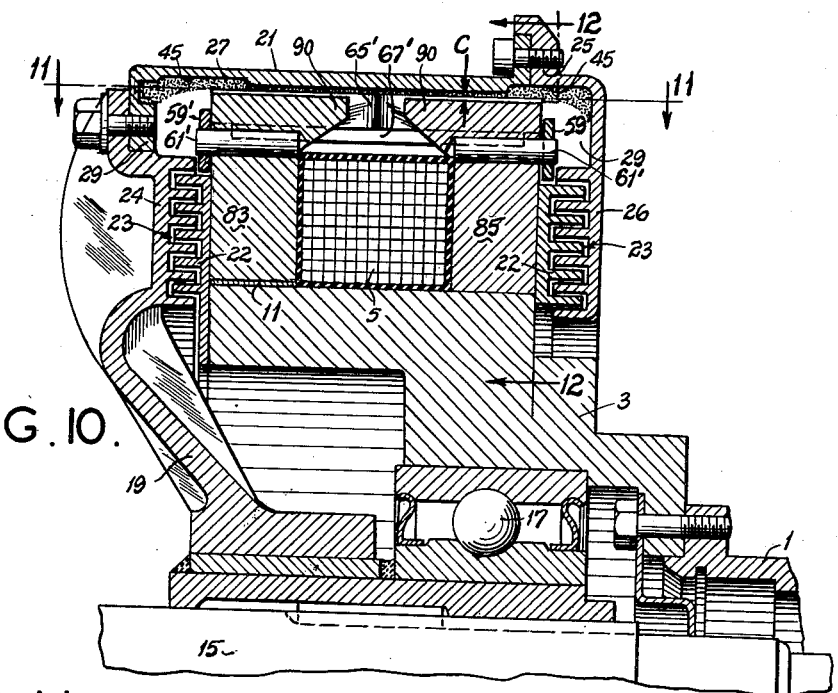
Figure 11:
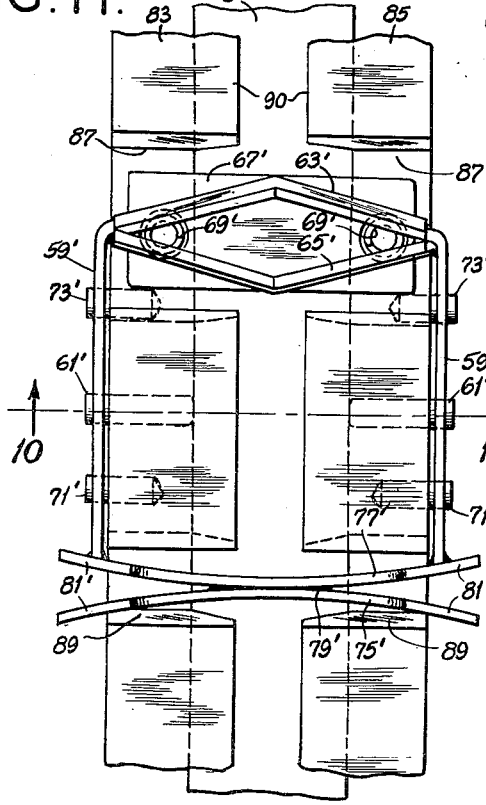
Figure 12:
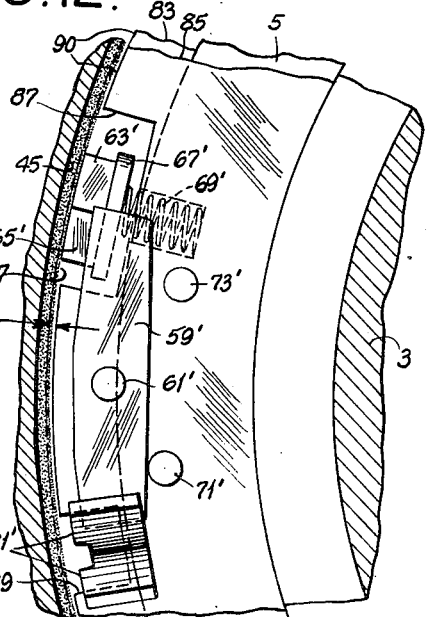

Figs. 4-6 are views corresponding to Figs. 1-3 respectively, showing an alternative embodiment of the invention; in which Fig. 4 is viewed substantially on line 4—4 of Fig. 5; Fig. 5 is viewed substantially on line 5—5 of Fig. 4; and Fig. 6 is viewed substantially on line 6—6 of Fig. 4;

Figs. 7-9 are views similar to Figs. 4-6 respectively, showing another embodiment; in which Fig. 7 is viewed on line 7—7 of Fig. 8; Fig. 8 is viewed on line 8—8 of Fig. 7; and Fig. 9 is viewed on line 9—9 of Fig. 7; and, Figs. 10-12 are views similar to Figs. 7-9 respectively, showing another embodiment; in which Fig. 10 is viewed on line 10—10 of Fig. 11; Fig. 11 is viewed on line 11—11 of Fig. 10; and Fig. 12 is viewed on line 12—12 of Fig. 10.

Similar reference characters indicate corresponding parts throughout the several views of the drawings.

Referring now more particularly to Figs. 1-3,

2 there is shown at numeral 1 what may be considered initially as a driving element to which is bolted a hub 3 of a field member. Hub 3 is composed of a magnetic material. Carried on the hub is an annular field coil 5, embraced on opposite sides by magnetic rings 7 and 9, which are fastened to the hub 3. Ring 7 is in direct contact with the hub while a nonmagnetic band 11 is interposed between the ring 9 and the hub, providing a magnetic gap. The purpose of this will appear.

Extending from the rings and embracing the coil 5 are interdigitated pole-forming teeth 13, the inner faces of which lie adjacent the coil and the outer faces of which lie in or near an imaginary external cylinder, as indicated in Figs. 1 and 3. At numeral 15 is what may be referred to initially as a driven shaft between which and the hub 3 is a pilot bearing 17. Attached to the shaft 15 is a supporting spider 19, to the outside of which is attached a rotor 21, forming a smooth interior inductor surface lying in a cylinder slightly larger than the imaginary cylinder which embraces the outer faces of the poles 13. The rotor 21 is magnetic at least in the portions opposite the poles 13. In a machine of the order of several feet in diameter, the resulting gap between the pole ends and the inside of the inductor 21 is of the order of .020 inch, as indicated at C. At numerals 23 are shown labyrinth running seals. The inner elements 22 of these seals are fastened to the rings 7 and 9, respectively. The outer element 24 of one seal is formed in the spider 19 and the outer element 26 of the other seal is bolted to the inductor 21, as indicated at 25. The members 22, 24, 26 forming the labyrinth seals are preferably nonmagnetic. By exciting the coil 5, a toroidal flux field envelopes it, passing through the rings 7, 9, teeth 13 and the inductor 21. Then if either member 1 or 15 is driven, the other will follow, due to magnetomotive reactions between the magnetic poles formed at the teeth 13 and the reactive magnetic field from eddy currents which are induced in the inductor 21. A purely eddy-current slip coupling of the above described nature operates with some slip; that is, it cannot be brought to complete synchronism because some relative rotation is necessary between the field and inductor members in order to obtain the eddy currents necessary for the reactive magnetism.

In order to bring about complete synchronism when coil 5 is sufficiently energized, we provide within the inductor 21 a mass of preferably semi-solid (not liquid nor solid) magnetic material 27. That is, material 27 is not only nonsolid but it is preferably semisolid. A suitable material is a mixture of grease and finely divided magnetic metal particles such as iron. A suitable finely divided magnetic iron serving the purpose is on the market under the name of Carbonyl-E iron. Another is Swedish powdered iron of about 300 mesh. A suitable grease is one made from a polymeric organic silicon compound such as one of the silicones (organosiloxanes), with a water-insoluble soap base. A typical satisfactory silicone grease is one manufactured by the Dow Corning Corporation, identified as DC 44, which at a fairly constant viscosity will withstand wide temperature variations, being practically nonvolatile and highly resistant to hardening. A satisfactory ratio by weight of the stated iron particles to the stated type of grease may be, for example, 3:1. Such a material is semisolid, having a consistency such that it will cling to a vertical or inverted surface for long periods of time without flowing. Moreover, it is not tacky. Its semisolid characteristics are similar to those of household petroleum jelly.

A quantity of the stated magnetic semisolid is introduced into the chamber formed by the inductor 21 around the poles 13. This chamber is carried out laterally to form side channels 29. The semisolid may either take up a position radially bridging the gap C, or a substantial amount of the grease may be forced from the gap into the channels 29. In order mechanically to control the positioning of the grease 27, two approximately opposite members of the poles 13 are provided with V-shaped or chevron-shaped raised surfaces such as shown at 31, which act as plows or scrapers. Thus, assuming that the coil 5 is unexcited (poles 13 and inductor 21 demagnetized), any relative motion of the poles 13 relative to the inductor 21 in the direction of the arrow in Fig. 2 will result in the plows or scrapers 31 plowing the semisolid out of the gap C. This is illustrated in Fig. 1, wherein the semisolid has been thrown out into ridges in the spaces 29. The semisolid may be drawn into the gap, even against the plowing-out action, by sufficiently exciting coil 5. This magnetizes the semisolid, drawing it into the gap C. Here it functions to transmit torque between opposite faces of the gap. This is assisted by the magnetic reactions from the eddy currents induced in the member 21.

An important feature of the invention is the semisolid property of the material 27 which tends fairly well to maintain any position into which it is pushed, without displacement by flowing under its own gravitational weight. Being semisolid, it can be pushed out of the gap by the plowing action, and pulled in by the magnetic field but if left alone will substantially maintain a position.

Operation is as follows, assuming at the start that the coil 5 is deenergized and that the grease is in the general initial position shown in Fig. 1. In this position the grease has been plowed out of the gap C and lies in the stated self-sustaining ridges in the channels 29. If now a prime mover connected with the driver 1 be started, the field members constituted by the parts 3, 5, 7, 9 and 13 may rotate freely because of the gap theretofore caused by the plows 31 between the grease and the pole ends. Thus idling may occur with substantially no drag, except possibly a slight amount of windage, between the driving and driven members 1 and 15.

If now the coil 5 be energized, there will be eddy currents generated in the inductor 21 which, due to the stated magnetomotive reactions, will accelerate inductor 21. At the same time, the magnetic field will draw in magnetic grease from the ridges in spaces 29 into the gap C, causing the gap to be filled even against plowing-out action of the plows 31. If the coil 5 is sufficiently excited, there will finaly occur a magnetic stiffening of the grease with complete synchronism between the driving and driven elements, the magnetic grease in the gap C acting as a static magnetic and frictional interlock. It will be seen that as synchronism is approached, the relative motions of the plows with respect to the inductor 21 become less, so that the mechanical efficiency of plowing is reduced until ultimately at synchronism there will be no plowing-out effect whatever. The clutch is then locked at 1:1 synchronous movement of the driving and driven elements.

To release the clutch in part or completely, the excitation of coil 5 is reduced or eliminated altogether. This reduces or eliminates the magnetism and nonsynchronous slip sets in. It should be remembered that at this time the magnetization of the grease in the gap C is also reduced, so that it softens or slumps and its holding action decreases to allow said slip. Immediately the plows assume a relative motion to the inductor and tend to sweep out grease from the gap. At some stage in the reduction of the magnetic field (near zero value) most of the grease is swept out and the nondrag idling conditions are resumed with a maximum amount of grease in the channels 29 (Figs. 1 and 3), a small amount being left in the gap C, as illustrated in Fig. 1.

It should be remarked in connection with deenergizing the coil 5, that the band of nonmagnetic material 11 in the toroidal magnetic circle around the coil 5 accelerates decay of the flux, so as to minimize the residual magnetism carried in the grease. Thus it more quickly slumps and is plowed out.

It is not necessary to plow all of the grease out of the gap C, and for this reason the height of the plows 31 is only a fraction of the gap width, for example, one-half of the gap width, or in the present example, .010 inch. This provides sufficient clearance for the poles which do not carry plows.

It is preferable that less than all of the poles 13 carry plows, two on opposite poles being sufficient and providing dynamic balance. One is sufficient if a high degree of dynamic balance is not required, as in slow-speed applications.

It will be observed that the magnetic grease, being a semisolid which holds its position on vertical and inverted surfaces and being limited in quantity for the purpose, will never in any substantial amount take up a position between the poles where it might be excessively churned. Thus it is unnecessary to close the spaces between poles. That is to say, the polar field member may present tooth-like irregularities toward the inner surface of the inductor drum 21 without undue resulting churning. It should be noted also that the centrifugal force of the grease in the drum 21 normally biases it toward leaving the gap. Thus if the amount of grease introduced is not excessive, it is possible at all times to plow in an air gap between the poles 13 and inductor 21, aided by the outslinging bias.

In Figs. 4–6 is shown another form of the invention in which like numerals designate like parts, so far as applicable. In this case, automatic scrapers are used which are movable relatively to the field member. Two opposite ones of these are sufficient. Only one will be described, since both are identical. One is sufficient if dynamic balance is unimportant, as on slow-speed machines. In this case, coaxial pivot pins 33 are provided in the bases of two adjacent poles 13. These pivot a rocker frame shown generally at 35. This rocker frame has side plates 37 connected at one end by means of V-shaped plowing-out portion 39. At the other end, plates 37 are connected by a bar 41, the ends of which are formed as plowing-in portions 43. Depressed grooves 45 are provided in the inductor 21 in planes lateral to the plane of rotation of the poles 13. These accommodate the plows 43, which are also operative in the stated lateral planes.

Referring again to the frame 35, the rear bar 41 thereof carries counterweights 47 adapted to effect equilibrium around pivot pins 33. The parts 37, 39, 41, 43 and 47 are composed of non-magnetic material such as stainless steel. Welded to the underside of the forward plow 39 is a magnetic slug 49, which reacts to any magnetic field generated by the coil 5 to be pulled in toward the center of rotation. Springs 51, reacting from the bottoms of sockets 53 in the rings 7 and 9, bias outward the out-plowing portion 39. The weights of these are taken into consideration in determining the equilibrium above mentioned. Inward movement of in-plowing plows 43 under bias of springs 51 is limited by pin stops 55, as is also the outward movement of plow 39. If the magnetic slug 49 be drawn in, a pin stop 57 limits the inward movement of the out-plowing plow 39 and the outward movement of the in-plowing members 43. The pin stops 55 and 57 are so arranged that either plow 39 or plows 43 move from respective positions inside of the cylinder, defining the ends of the poles 13 to positions about .010 inch outside thereof and in the approximately .020 inch gap C, without touching the inner face of the inductor 21. The masses of the movable pivot parts on opposite sides of the center lines of pivot pins 33 being such as to counterbalance one another against centrifugal forces, the action of the plow member 35 is under control of the magnetic slug 49 acting against the springs 51.

Operation of the form of the invention shown in Figs. 4-6 is as follows, assuming the driving member 1 to be rotating relatively to the inductor 21 in the direction illustrated by the arrow in Fig. 6, the coil 5 being deenergized:

The springs 51 push out the out-plowing member 39 which plows the grease from the inductor surfaces and into the channels 45. Upon exciting the coil 5, the slug 49 is drawn inward against the action of springs 51, thus drawing in the plow 39 and pushing the in-plowing members 43 into the grooves 45. The magnetic grease is thus plowed inward from the grooves into the gap C, the action being augmented by the attraction of the grease into the gap caused by the magnetic field in the gap. Otherwise the action is the same as that already described in connection with the form of the invention shown in Fig. 1-3. However, in the case of the construction of Figs. 4-6, the out-plowing and in-plowing members 39 and 43, respectively, are automatically positioned in response to field excitation, making both in-plowing and out-plowing actions positive and coordinated with clutch closing (energizing) and releasing (deenergizing) operations. In Figs. 4-6 the parts are in deenergized releasing positions.

In Figs. 7-9 is shown a form of the invention which will operate similarly in either direction of relative motion between the members 3 and 15. Like numerals designate like parts where applicable. In this case, each plow assembly is composed of side arms 59, pivoted to the field member at pins 61. Extra space is left between two of the poles 13 to accommodate a diamond-shaped double-ended plowing-out portion having oppositely directed V-shapes or chevrons 63 and 65. Welded to the bottom of these is a magnetic slug 67. Springs 69 bias outward the portions 63, 65, 67, the movement being limited by pin stop 71. Inward movement of the plows 63 and 65 is limited by pin stops 73. The opposite ends of the side bars 59 are joined by oppositely concave plows 75 and 77, joined centrally at 79 and provided with off-set portions 81 for entering the grooves 45.

Movement of the rotary field-carrying member 3 in the direction shown by the solid arrow in Fig. 9, relative to the member 15, results in the same type of operation already described in the form of the invention shown in Figs. 4-6. In this case, the operative out-plowing element is 63 and the operative in-plowing element is 77. On the other hand, should the member 15 overrun the movement of member 3, becoming the driver, as shown by the dotted arrow in Fig. 9, then the out-plowing portion 65 and the in-plowing portion 75 become effective. Otherwise the operation is the same as already made clear. In this modification the in-plowing portions 75 and 77 are continuously concave down to the central engaging portion 79, so that the in-plowing component of action when initiated is effective across the entire inner face of the inductor 21. As before, the rocking assembly of parts forming the plows is counterbalanced in response to centrifugal force.

This form of the invention provides not only for allowing either 1 or 15 to be the driver under a given direction of rotation, but when either 1 or 15 is driving, the rotation is reversible, without losing the desired plowing actions.

In Figs. 10-12 is shown another modification which is similar to that shown in Figs. 7-9, like numerals designating like parts where applicable. In this case there is substituted for the poles 13, adjacent the coil 5, a pair of continuous magnetic rings 83 and 85, which are interrupted at 87 and 89 only enough to accommodate the motions of the opposite ends of the rocking plows. These rings peripherally overlap the coil 5, as indicated at 90. Operation so far as the plow is concerned is the same as already described in connection with Figs. 7-9. However, this type of clutch, essentially having no discontinuities in the toroidal field sweeping the member 21, will not generate eddy currents in this member. This is with the slight exception of the few stray eddy currents produced because of the interruptions 87 and 89, but these are insignificant. Thus in this form of the invention the entire coupling action when the magnetic grease is drawn and plowed into the gap C is due to the magneto-frictional effect or resistance to shear afforded by any magnetic grease in the gap C. Under partial excitation of the coil, there will be substantial slip, and as the excitation is increased, the magnetic grease stiffens until synchronism is reached, in which contingency the driving and driven members are locked together. Since the type of plow shown in Figs. 10–12 is functionally the same as that shown in Figs. 7–9, so far as plowing action is concerned, no further description is needed, similar but primed reference characters indicating plow parts obviously operating similarly to the plow parts of Figs. 7–9. As in the case of Figs. 7–9, either member 5 or 15 may be the driving or driven member.

In the forms of the invention shown in Figs. 4–12, the plows are permitted to move out only partially into the magnetic gap C. It is clear that they could be allowed to move out against the inner face of the inductor 21. The former action is preferable from the view point of quietness of operation and reduction of wear. Moreover, it is of some advantage to have a thin film of magnetic material in the gap at the start of excitation. However, constructions with plows which engage the inductor surface are in some cases useful. In is also clear that instead of the plows being V-shaped, they may be continuously angled from one side of the gap to the other, so as to plow all of the material to one side or the other instead of to both sides. The latter, however, is preferable since the maximum travel of the material is reduced to one-half.

In view of the above, it will be seen that several advantages accrue from the invention. First, a practically nondrag idling action occurs between the driving and driven members when the coil 5 is deenergized. Second, the magnetic fluid being a semisolid, never runs to the bottom of the container afforded by the inductor 21, so that the apparatus is in just as dynamically balanced a condition when starting as at any other time. Apparatus employing a magnetic liquid has an initial out-of-balance condition until the liquid is spread evenly by centrifugal force. Moreover, in the case of a semisolid matrix, magnetic particles in the containing semisolid do not tend to settle out of the matrix. In a magnetic liquid employing finely divided metallic particles there is a settling action during long periods of rest of the apparatus. It is sometimes necessary to "break loose" a fairly solidified mass of settled-out metal particles in the bottom of the inductor when a liquid matrix is used. This is not true in the case of the semisolid matrix used herein, since it maintains its position at all times around the inductor 21.

Another feature is that since the magnetic semisolid holds its position on the inside of the member 21 and outside of the central portion, the poles do not need to be encased or provided with nonmagnetic filler between them, as is desirable to prevent churning in the case of a magnetic liquid. The only churning encountered in the case of the present invention is inconsequential and occurs only during short intervals of plow action. Thus the magnetic semisolid will be of a more stable nature than a magnetic liquid, partly because it is not subjected to the excessive churning action. It may also be observed that a magnetic grease is much easier to retain between two rotary members by means of ordinary seals than is a magnetic liquid.

The plows contribute advantages which may be used without semisolid magnetic material. For example, if magnetic liquid-like flowable material such as specified in U. S. Patent 2,525,571 is substituted for the magnetic semisolid, the use of plows helps quickly to distribute the liquid and will aid in breaking any sedimentation of such material as above described. The plows are also useful in connection with magnetic flowable material of the dry powder type such as described in U. S. Patent 2,519,449 since they prevent any packing of such material from interfering with clutch release.

It will be understood that the threshold excitation of the field member for operating the movable plow may be any necessary value. In the claims that follow, any value of excitation above the threshold value is referred to as substantial excitation. Values below this may be understood to correspond to a substantially unexcited condition.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A dynamoelectric machine comprising relatively rotary field and magnetic members, one being inside the other which forms a cylindric compartment, a magnetic semisolid mixture carried in said compartment, one member comprising an annular field coil and adjacent polarizing rings forming a gap relative to the magnetic member into and from which the semisolid mixture may move, and a pivoted scraper on one of the members movable between positions in and out of said gap.

2. A dynamoelectric machine comprising relatively rotary field and magnetic members, the former being inside of the latter which forms a cylindric compartment, a magnetic semisolid mixture carried in said compartment, the field member comprising an annular field coil and adjacent polarizing rings forming a gap relative to the magnetic member into and from which the semisolid mixture may move, and a pivoted scraper on the field member movable between positions in and out of said gap.

3. A dynamoelectric machine comprising a field member and an adjacent magnetic member spaced therefrom by an annular magnetic gap, said members being relatively rotary, one of said members being outside of the other and forming an annular container, a mixture composed of a semisolid grease-like substance and magnetic particles dispersed therethrough located in said container and movable into a position in or out of said gap, and an angled plow extending into said gap adapted upon relative movement between the field and magnetic members to move said mixture laterally with respect to the gap.

4. A dynamoelectric machine comprising relatively rotary field and magnetic members having a gap therebetween, the magnetic member being outside of the field member and forming a cylindric compartment, a magnetic semisolid mixture in said compartment, and a plow movably mounted upon the inner field member to take up a position either out of the gap or extending partially across it, said plow incorporating a magnetic element responsive to a magnetic field generated in the field member to be drawn completely out of the gap.

5. A dynamoelectric machine comprising relatively rotary field and magnetic members having a gap therebetween, one of said members being outside of the other and forming a cylindric compartment, a magnetic semisolid mixture in said compartment, and a plow movably mounted upon the inner member to take up a position either in or out of the gap, said plow incorporating a magnetic element responsive to a magnetic field generated in the field member to be drawn out of the gap.

6. A dynamoelectric machine comprising relatively rotary field and magnetic members having a gap therebetween, one of said members being outside of the other and forming a cylindric compartment, a magnetic semisolid mixture in said compartment, a plow movably mounted upon the inner member to take up a position either in or out of the gap, and means normally biasing the plow into the gap, said plow incorporating an element responsive to substantial excitation of the field member to be drawn out of the gap against said bias.

7. A dynamoelectric machine comprising relatively rotary field and magnetic members having a gap therebetween, one of said members being outside of the other and forming a cylindric compartment, a magnetic semisolid mixture in said compartment, a rocker mounted upon the inner member and having an in-plowing plow at one end and an out-plowing plow at the other end, each plow being adapted to take up positions to plow said mixture either into or out of the gap, and means normally biasing the rocker to one position, said rocker incorporating a magnetic element responsive to substantial excitation of the field member to be moved to its other position.

8. A dynamoelectric machine comprising relatively rotary field and magnetic members having a gap therebetween, one of said members being outside of the other and forming a cylindric compartment including a receptive recess on one side of the gap, a mixture composed of a semisolid grease-like substance and magnetic particles dispersed therethrough in said compartment movable to and from the gap and recess, and a rocker movably mounted upon the inner member and carrying an out-plowing plow for cooperation with said mixture in the gap and an in-plowing plow for cooperation with said mixture in the recess, said rocker incorporating an element responsive to substantial excitation of the field member to draw the out-plowing element out of the gap and to move the in-plowing plow into the recess.

9. A dynamoelectric machine comprising relatively rotary field and magnetic members having a gap therebetween, one of said members being outside of the other and forming a cylindric compartment including a receptive recess on one side of the gap, a magnetic semisolid mixture in said compartment, and a rocker movably mounted upon the inner member and carrying an out-plowing element for cooperation with the gap and an in-plowing element for cooperation with the recess, said rocker incorporating an element responsive to substantial excitation of the field member to move so as to draw the out-plowing element out of the gap and to move the in-plowing element into the recess, both the out-plowing and in-plowing elements having oppositely slopping portions effective to perform the out-plowing and in-plowing functions relative to the gap respectively regardless of the relative motions of the rotary members.

10. A dynamoelectric machine comprising relatively rotary field and magnetic members having a gap therebetween, one of said members being outside of the other and forming a cylindric compartment including space on one side of the gap, a magnetic semisolid mixture in said compartment, and a rocker movably mounted upon the inner member and carrying an outplowing element for cooperation with the gap and an in-plowing element for cooperation with the space, said rocker incorporating an element responsive to substantial excitation of the field member to move so as to actuate the out-plowing element out of the gap and to actuate the in-plowing element into the space.

11. A dynamoelectric machine comprising relatively rotary field and magnetic members having a gap therebetween, one of said members being outside of the other and forming a cylindric compartment including space on opposite sides of the gap, a magnetic semisolid mixture in said compartment, and a rocker movably mounted upon the inner member and carrying a V-shaped out-plowing element for cooperation with the gap and V-shaped in-plowing elements for cooperation with said space and the gap, said rocker incorporating an element responsive to substantial excitation of the field member to move so as to draw the out-plowing element out of the gap and to move the in-plowing elements into the gap, said rocker being substantially dynamically balanced in respect to centrifugal forces thereon.

12. A dynamoelectric machine comprising relatively rotary field and magnetic members having a gap therebetween, one of said members being outside of the other and forming a cylindric compartment including a receptive recess on one side of the gap, a magnetic semisolid mixture in said compartment, and a rocker movably mounted upon the inner member and carrying an element for out-plowing cooperation with the gap and an element for in-plowing cooperation with the recess, said rocker incorporating an element responsive to substantial excitation of the field member to move so as to draw the out-plowing element out of the gap to stop out-plowing and to move the in-plowing element into the recess to effect in-plowing, both the out-plowing and in-plowing elements having oppositely sloping portions effective to perform the out-plowing and in-plowing functions respectively regardless of the relative motions of the rotary members.

13. A dynamoelectric machine comprising relatively rotary field and magnetic members, the former being inside of the latter, said latter forming a cylindric compartment, a magnetic semisolid mixture carried in said compartment, the field member comprising an annular field coil and adjacent polarizing rings forming a gap relative to the magnetic member into and from which the semisolid mixture may move, a pivoted plow on the field member movable between positions in and out of said gap, an element biasing the plow under substantially deenergized conditions of the field coil to take up a position within the gap, and a magnetic member on the plow responsive to substantial excitation of the field coil and against said bias to cause the plow to take up a position outside of the gap.

14. A dynamoelectric machine comprising a field member and a relatively rotary adjacent magnetic member spaced therefrom by a working magnetic gap, each having a working periphery defining the gap, one of said members forming an enclosing chamber containing said gap and a normally empty space adjacent the gap, a clinging flowable magnetic material located between said rotary members, a plow device movably mounted on one of said members and normally biased when the field member is substantially unexcited to extend from the working periphery of its supporting member and to plow at least some of said material out of the gap into said space and responsive to substantial excitation of said field member to plow said material into the gap from said space, the plowing actions being responsive to certain relative movements between said members.

15. A dynamoelectric machine comprising a field member and a relatively rotary adjacent magnetic member spaced therefrom by a working magnetic gap, each having a working periphery defining the gap, one of said members forming an enclosing chamber containing the gap and a normally empty space adjacent the gap, a clinging flowable magnetic material located between said rotary members, and a double-acting plow device movably mounted on one of said members and normally biased when the field member is substantially unexcited to extend from the periphery of said member and to plow at least some of said material out of the gap into said space and responsive to substantial excitation of said field member to plow material into the gap from said space, the stated plowing actions being effective in accordance with the directions of the relative movements of said members.

16. A dynamoelectric machine comprising a field member and a surrounding magnetic member spaced therefrom by a working magnetic gap and forming a chamber containing said gap and a normally empty space adjacent the gap, each member having a working periphery adjacent the gap, said members being relatively rotary on a common axis, a flowable magnetic material located between said rotary members, and a plow attached to the field member and extending from its periphery and at an angle relative to said axis, which plow extends into the gap to plow at least some of the material therefrom into said space when the field member is de-excited, to provide an air gap between the spaced peripheries of the rotary members.

17. A dynamoelectric machine comprising a field member and an adjacent magnetic member spaced therefrom by a peripheral working magnetic gap, each member having a working periphery adjacent the gap, said members being relatively rotary and one of them forming a chamber containing the gap and a space adjacent the gap, a flowable magnetic material located between said rotary members, and a plow extending from the periphery of one member and into the gap and adapted upon relative movement of the one member with respect to the other to plow at least some of said material from the gap into said adjacent space to provide an air gap between the spaced peripheries of the rotary members.

18. A dynamoelectric machine comprising an inner polar field member the periphery of which is essentially circular and an outer adjacent essentially circular magnetic member spaced therefrom by a peripheral working magnetic gap and forming a container which includes the gap and a space adjacent the gap, said members being relatively rotary, a flowable magnetic material located between said rotary members and contained in the outer one, and a plow extending from the polar periphery of the inner field member into the gap and adapted upon relative movement of one member with respect to the other to plow at least some of said material from the gap into said space to provide an air gap between the relatively rotary members.

19. A dynamoelectric machine comprising a field member and an adjacent magnetic member spaced therefrom by a peripheral working magnetic gap, each member having a working periphery adjacent the gap, said members being relatively rotary and one of them forming a chamber containing the gap and a space adjacent the gap, a flowable magnetic material located between said rotary members, and a chevron-shaped plow carried by one member and pointed in one direction and adapted upon relative movement of the last-mentioned member in said direction with respect to the other member to plow said material from the gap into said space, said plow extending from the working periphery of the member upon which it is mounted.

20. A dynamoelectric machine comprising an essentially circular magnetic field member and an adjacent circular magnetic member spaced therefrom by a working magnetic gap, each member having a working periphery adjacent the gap, said members being relatively rotary and one forming a container around the other including the gap and a space adjacent the gap, a mixture adapted to cling to the surfaces of the members without gravitating therefrom and composed of a semisolid grease-like substance and magnetic particles dispersed therethrough, said mixture being located between said members and adapted to stiffen and close the gap so as to synchronize the members when the field member is sufficiently excited, and plow means attached to and extending beyond the working periphery of one of said relatively rotary members and extending into the gap defined by said members, said plow means subtending a limited part of the periphery of the member from which it extends, whereby upon de-excitation of the field member and relative movement between the members said plow will plow the mixture out of the gap into said adjacent space to form a circular space between the mixture and the working periphery of the member to which the plow is attached.

21. A dynamoelectric machine comprising a magnetic and essentially cylindric field member and an adjacent cylindric magnetic member spaced therefrom by an essentially cylindric gap, said members being relatively rotary, one of said cylindric members being inside of the other, said other member forming a container including the gap and a space adjacent the gap, a mixture adapted to cling to the surfaces of either member without gravitating therefrom and composed of a semisolid grease-like substance and magnetic particles dispersed therethrough, said mixture being located between said members and adapted to stiffen and close the gap so as to synchronize the members when the field member is sufficiently excited, and plow means attached to and extending beyond the periphery of the one of said cylindric members which is inside the other and extending outward into the cylindric gap defined by the members and subtending a limited part of the peripheral extent of the gap, whereby upon de-excitation of the field member and relative movement between the members said plow means will plow the mixture out of the gap into said adjacent space to provide a cylindric space between the inner member and the mixture clinging to the outer member.

MARTIN P. WINTHER.
RALPH L. JAESCHKE.

(References on following page)

REFERENCES CITED

The following references are of record in the file of this patent:

UNITED STATES PATENTS

| Number | Name | Date |
|---|---|---|
| 811,654 | Murphy | Feb. 6, 1906 |
| 1,927,616 | Rudquist | Sept. 19, 1933 |
| 2,398,638 | Hedtel | Apr. 16, 1946 |
| 2,525,571 | Winther | Oct. 10, 1950 |

OTHER REFERENCES

Raymond Engineering Laboratory Report, September 17, 1948.

National Bureau of Standards Technical Report 1213. (Received in Division 68 on March 30, 1948.)